(12) United States Patent
Cower

(10) Patent No.: US 11,869,274 B2
(45) Date of Patent: *Jan. 9, 2024

(54) FACE-BASED FRAME RATE UPSAMPLING FOR VIDEO CALLS

(71) Applicant: Google LLC, Mountain View, CA (US)

(72) Inventor: Dillon Cower, Woodinville, WA (US)

(73) Assignee: Google LLC, Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/707,661

(22) Filed: Mar. 29, 2022

(65) Prior Publication Data

US 2022/0222968 A1    Jul. 14, 2022

Related U.S. Application Data

(63) Continuation of application No. 16/968,115, filed as application No. PCT/US2019/060700 on Nov. 11, 2019, now Pat. No. 11,321,555.

(Continued)

(51) Int. Cl.
*G06V 40/16* (2022.01)
*G06T 7/246* (2017.01)
(Continued)

(52) U.S. Cl.
CPC .......... *G06V 40/172* (2022.01); *G06T 3/4007* (2013.01); *G06T 5/002* (2013.01);
(Continued)

(58) Field of Classification Search
None
See application file for complete search history.

(56) References Cited

U.S. PATENT DOCUMENTS 8,150,155 B2 * 4/2012 El-Maleh .............. G06V 10/25
                                                            382/173
8,355,039 B2 * 1/2013 Michrowski .......... H04N 7/147
                                                            709/204
(Continued)

FOREIGN PATENT DOCUMENTS

JP    2011-039869    2/2011
JP    2011-092547    5/2011
(Continued)

OTHER PUBLICATIONS

Cekic, M. M.; Bayazit, U."New Frame Rate Up-Conversion Based on Foreground/Background Segmentation". Proceedings 2011 IEEE Symposium on Computational Intelligence for Multimedia, Signal and Vision Processing (CIMSIVP 2011): 67-70;viii+148. IEEE. (2011) (Year: 2011).*

(Continued)

*Primary Examiner* — Randolph I Chu
(74) *Attorney, Agent, or Firm* — IP Spring

(57) ABSTRACT

A method includes receiving a set of video frames that correspond to a video, including a first video frame and a second video frame that each include a face, wherein the second video frame is subsequent to the first video frame. The method further includes performing face tracking on the first video frame to identify a first face resampling keyframe and performing face tracking on the second video frame to identify a second face resampling keyframe. The method further includes deriving an interpolation amount. The method further includes determining a first interpolated face frame based on the first face resampling keyframe and the interpolation amount. The method further includes determining a second interpolated face frame based on the second face resampling keyframe and the interpolation amount. The method further includes rendering an interpolated first face (Continued)

and an interpolated second face. The method further includes displaying a final frame.

20 Claims, 11 Drawing Sheets

Related U.S. Application Data

(60) Provisional application No. 62/884,135, filed on Aug. 7, 2019.

(51) Int. Cl.
*G06T 5/00* (2006.01)
*G06T 5/50* (2006.01)
*G06V 20/40* (2022.01)
*G06T 3/40* (2006.01)

(52) U.S. Cl.
CPC ............ *G06T 5/50* (2013.01); *G06T 7/248* (2017.01); *G06V 20/40* (2022.01); *G06T 2207/10016* (2013.01); *G06T 2207/20212* (2013.01); *G06T 2207/30201* (2013.01)

(56) References Cited

U.S. PATENT DOCUMENTS

| | | | |
|---|---|---|---|
| 11,507,646 B1* | 11/2022 | Baldwin | G06V 40/172 |
| 2005/0047662 A1* | 3/2005 | Gorodnichy | G06T 7/254 |
| | | | 382/218 |
| 2006/0215014 A1 | 9/2006 | Cohen et al. | |
| 2006/0238445 A1* | 10/2006 | Wang | H04N 19/177 |
| | | | 345/55 |
| 2010/0033602 A1* | 2/2010 | Okada | H04N 23/80 |
| | | | 348/241 |
| 2017/0132828 A1 | 5/2017 | Zelenin et al. | |
| 2019/0174125 A1* | 6/2019 | Ninan | H04N 21/23439 |
| 2019/0251684 A1* | 8/2019 | Ko | G06T 7/0002 |
| 2020/0250436 A1* | 8/2020 | Lee | G06F 18/2413 |
| 2020/0364838 A1* | 11/2020 | Liu | G06T 11/001 |

FOREIGN PATENT DOCUMENTS

| | | |
|---|---|---|
| JP | 2011-227704 | 11/2011 |
| JP | 2016-001447 | 1/2016 |
| KR | 1020130130695 | 12/2013 |
| KR | 1020170056516 | 5/2017 |

OTHER PUBLICATIONS

EPO, Communication Pursuant to Article 94(3) EPC for European Patent Application No. 19836686.6, dated Jun. 17, 2022, 6 pages.
Benois-Pineau, et al., "A New Method for Region-Based Depth Ordering in a Video Sequence: Application to Frame Interpolation", Journal of Visual Communication and Image Representation, vol. 13, No. 3, Sep. 1, 2002, pp. 363-385.
Choi, et al., "Motion-Compensated Frame Interpolation Using Bilateral Motion Estimation and Adaptive Overlapped Block Motion Compensation", IEEE Transactions on Circuits and Systems for Video Technology, vol. 17, No. 4, Apr. 2007, pp. 407-416.
WIPO, International Search Report for International Patent Application No. PCT/US2019/060700, dated Apr. 9, 2020, 5 pages.
WIPO, Written Opinion for International Patent Application No. PCT/US2019/060700, dated Apr. 9, 2020, 6 pages.
Guo, et al., "Feature-based motion compensation interpolation for frame rate up-conversation", Neurocomputing, vol. 123, Jan. 10, 2014, pp. 390-397.
JPO, Notice of Allowance for Japanese Patent Application No. 2020-542990, dated Nov. 30, 2021, 3 pages.
Kim, et al., "True motion compensation with feature detection for frame rate up-conversion", 2015 IEEE International Conference on Image Processing (ICIP), Sep. 27, 2015, pp. 2260-2264.
KIPO, Notice of Allowance (with English translation) for Korean Patent Application No. 10-2020-7023054, dated May 17, 2021, 3 pages.
Munoz-Jimenez, et al., "Bidirectional Motion Estimation Approach Using Warping Mesh Combined to Frame Interpolation", Signal Processing and Information Technology, Dec. 16, 2008, pp. 249-253.
USPTO, Notice of Allowance for U.S. Appl. No. 16/968,115, dated Jan. 7, 2022, 9 pages.
Wang, et al., "Use of two-dimensional deformable mesh structures for video coding, Part II—The analysis problem and a region-based coder employing an active mesh representation", IEEE Transactions on Circuits and Systems for Video Technology, vol. 6, No. 6, Dec. 1, 1996, pp. 647-659.
Zollhofer, et al., "State of the Art on Monocular 3D Face Reconstruction, Tracking, and Applications", Computer Graphics Forum, vol. 37, No. 2, pp. 523-550, May 1, 2018.
JPO, Office Action for Japanese Patent Application No. 2021-209573, dated Feb. 21, 2023, 4 pages.
JPO, Notice of Allowance (with English translation) for Japanese Patent Application No. 2021-209573, Jun. 27, 2023, 5 pages.

\* cited by examiner

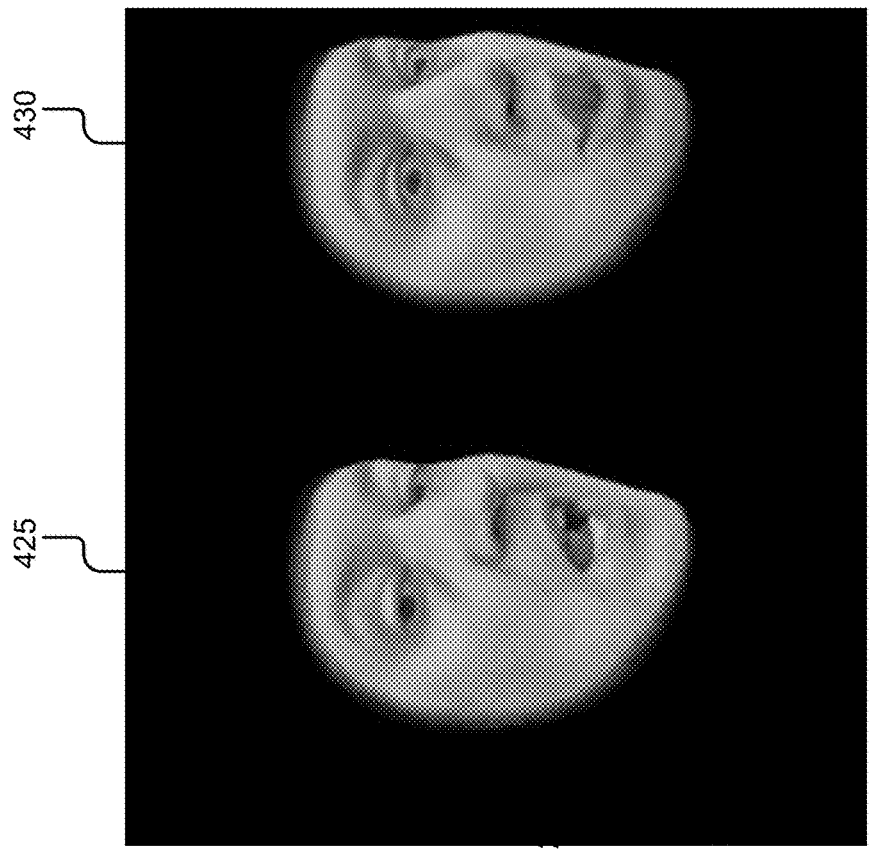
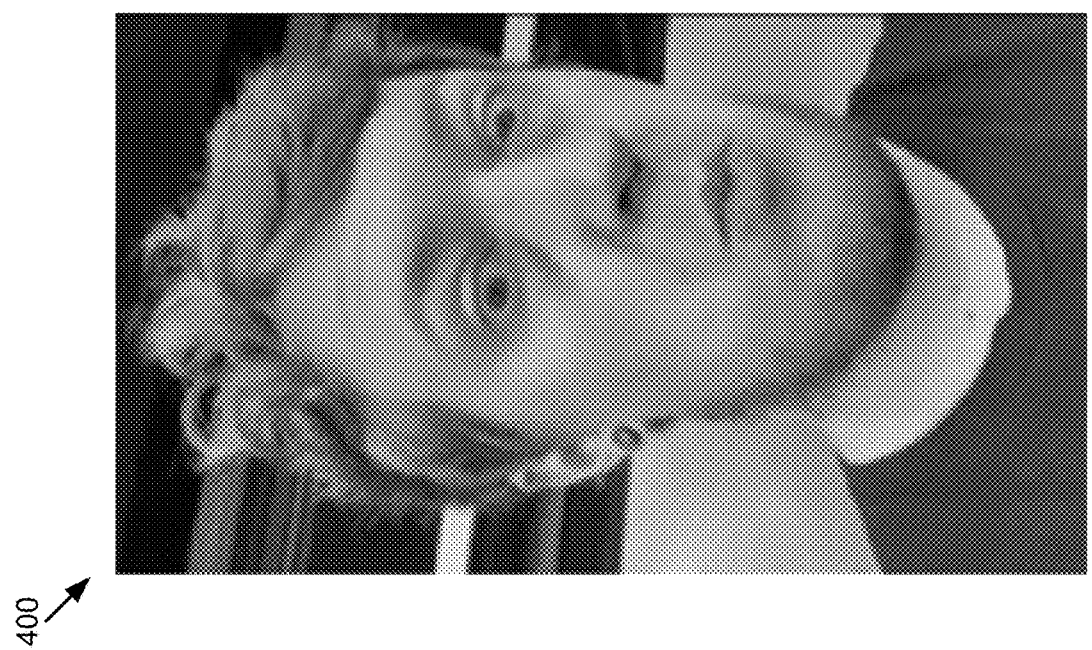
FIG 4B
FIG 4A

FACE-BASED FRAME RATE UPSAMPLING FOR VIDEO CALLS

CROSS REFERENCE TO RELATED APPLICATIONS

The present application is a continuation of U.S. patent application Ser. No. 16/968,115, filed Aug. 6, 2020 and titled FACE-BASED FRAME RATE UPSAMPLING FOR VIDEO CALLS, which is a U.S. National Phase application of International Patent Application No. PCT/US2019/060700, filed Nov. 11, 2019 and titled FACE-BASED FRAME RATE UPSAMPLING FOR VIDEO CALLS, which claims priority to U.S. Provisional Patent Application No. 62/884,135, filed Aug. 7, 2019 and titled FACE-BASED FRAME RATE UPSAMPLING FOR VIDEO CALLS, the entire contents of both of which are hereby incorporated by reference.

BACKGROUND

Video streaming on a mobile device, such as video streaming used in video calling applications, can use a low frame rate, such as 15 frames per second, to conserve bandwidth or other resources. However, lower frame rates correspond to an unsatisfactory viewer experience. For example, in a video call where a subject experiences rapid motion, lower frame rates can lead to a viewer perceiving stutter in the motion. While many mobile devices are capable of rendering a higher frame rate video (e.g., 25 FPS, 30 FPS, 60 FPS, 90 FPS, etc.), bandwidth, battery, or local processing capacity constraints can make high frame rates impractical.

Traditional motion interpolation techniques use optical flow or voxel flow to detect movement of pixels between frames. Inter-frame flow is interpolated to synthesize interpolated frames. However, determining and interpolating the flow is computationally expensive even when performed on the graphics processing unit of a desktop computer because it requires analyzing each pixel to identify movement between frames. As a result, this approach is far too computationally demanding to be used to display video on a mobile device or other devices constrained by computational capability. In addition, traditional motion interpolation works well on a television where pre-processing of the video occurs. This is unfeasible for video streaming where the video is displayed in real time.

The background description provided herein is for the purpose of generally presenting the context of the disclosure. Work of the presently named inventors, to the extent it is described in this background section, as well as aspects of the description that may not otherwise qualify as prior art at the time of tiling, are neither expressly nor impliedly admitted as prior art against the present disclosure.

SUMMARY

Embodiments generally relate to a method that includes receiving a set of video frames that correspond to a video, the set of video frames including a first video frame and a second video frame that each include a face, wherein the second video frame is subsequent to the first video frame. The method further includes performing face tracking on the first video frame to identify a first face resampling keyframe, the first face resampling keyframe including a first head transform matrix and first face landmark vertices. The method further includes performing face tracking on the second video frame to identify a second face resampling keyframe, the second face resampling keyframe including a second head transform matrix and second face landmark vertices. The method further includes deriving an interpolation amount. The method further includes determining a first interpolated face frame based on the first face resampling keyframe and the interpolation amount. The method further includes determining a second interpolated face frame based on the second face resampling keyframe and the interpolation amount. The method further includes interpolating a first background of the first face resampling keyframe and a second background of the second face resampling keyframe based on the interpolation amount. The method further includes rendering an interpolated first face and an interpolated second face. The method further includes displaying a final frame that is based on the interpolated first background, the interpolated second background, the interpolated first face, and the interpolated second face.

In some embodiments, the method further comprises blending the first background with the second background to obtain a blended background, blending the interpolated first face with the interpolated second face to obtain a blended interpolated face, and generating the final frame by placing a smooth face on top of the blended interpolated face and the blended background. In some embodiments, determining the first interpolated face frame includes: using the first head transform matrix to extract a translation vector, a rotation quaternion, and a scale vector, linearly interpolating the translation vector, using a linear interpolation to interpolate the rotation quaternion to generate an interpolated rotation quaternion, linearly interpolating the scale vector to generate an interpolated scale vector, composing an interpolated translation-rotation-scale matrix based on the interpolated translation vector, the interpolated rotation quaternion, and the interpolated scale vector, and calculating an interpolated position for the interpolated first face using the interpolated translation-rotation-scale matrix. In some embodiments, the interpolation amount is derived from (a) a duration between the first face resampling keyframe and the second face resampling keyframe and (b) a current render time. In some embodiments, determining the second interpolated face frame includes calculating a respective displacement for each vertex in the second face landmark vertices. In some embodiments, interpolating the first background and the second background is done with alpha blending. In some embodiments, rendering includes at least one of feathering of edges of the face or fading between the first interpolated face frame and the second interpolated face frame based on the interpolation amount. In some embodiments, performing face tracking on the first video frame further includes determining first texture coordinates for the first face resampling keyframe and a timestamp and the first texture coordinates are applied to the first face landmark vertices. In some embodiments, the first background and the face are identified by performing red green blue (RGB) face tracking on the first video frame.

A non-transitory computer readable medium with instructions stored thereon that, when executed by one or more computers, may cause the one or more computers to perform operations, the operations comprising: receiving a set of video frames that correspond to a video, the set of video frames including a first video frame and a second video frame that each include a face, wherein the second video frame is subsequent to the first video frame, performing face tracking on the first video frame to identify a first face resampling keyframe, the first face resampling keyframe including a first head transform matrix and first face landmark vertices, performing face tracking on the second video frame to identify a second face resampling keyframe, the second face resampling keyframe including a second head transform matrix and second face landmark vertices, deriving an interpolation amount, determining a first interpolated face frame based on the first face resampling keyframe and the interpolation amount, determining a second interpolated face frame based on the second face resampling keyframe and the interpolation amount, interpolating a first background of the first face resampling keyframe and a second background of the second face resampling keyframe based on the interpolation amount, rendering an interpolated first face and an interpolated second face, and displaying a final frame that is based on the interpolated first background, the interpolated second background, the interpolated first face, and the interpolated second face.

In some embodiments, the operations further comprise: blending the first background with the second background to obtain a blended background, blending the interpolated first face with the interpolated second face to obtain a blended interpolated face, and generating the final frame by placing a smooth face on top of the blended interpolated face and the blended background. In some embodiments, determining the first interpolated face frame includes: using the first head transform matrix to extract a translation vector, a rotation quaternion, and a scale vector, linearly interpolating the translation vector, using a linear interpolation to interpolate the rotation quaternion to generate an interpolated rotation quaternion, linearly interpolating the scale vector to generate an interpolated scale vector, composing an interpolated translation-rotation-scale matrix based on the interpolated translation vector, the interpolated rotation quaternion, and the interpolated scale vector, and calculating an interpolated position for the interpolated first face using the interpolated translation-rotation-scale matrix. In some embodiments, the interpolation amount is derived from (a) a duration between the first face resampling keyframe and the second face resampling keyframe and (b) a current render time. In some embodiments, determining the second interpolated face frame includes calculating a respective displacement for each vertex in the second face landmark vertices. In some embodiments, interpolating the first background and the second background is done with alpha blending.

A system may comprise one or more processors; and a memory that stores instructions that, when executed by the one or more processors cause the one or more processors to perform operations comprising: receiving a set of video frames that correspond to a video, the set of video frames including a first video frame and a second video frame that each include a face, wherein the second video frame is subsequent to the first video frame, performing face tracking on the first video frame to identify a first face resampling keyframe, the first face resampling keyframe including a first head transform matrix and first face landmark vertices, performing face tracking on the second video frame to identify a second face resampling keyframe, the second face resampling keyframe including a second head transform matrix and second face landmark vertices, deriving an interpolation amount, determining a first interpolated face frame based on the first face resampling keyframe and the interpolation amount, determining a second interpolated face frame based on the second face resampling keyframe and the interpolation amount, interpolating a first background of the first face resampling keyframe and a second background of the second face resampling keyframe based on the interpolation amount, rendering an interpolated first face and an interpolated second face, and displaying a final frame that is based on the interpolated first background, the interpolated second background, the interpolated first face, and the interpolated second face.

In some embodiments, the operations further include: blending the first background with the second background, blending the interpolated first face with the interpolated second face, and generating the final frame by placing a smooth face on top of a blended interpolated face and a blended background. In some embodiments, determining the first interpolated face frame includes: using the first head transform matrix to extract a translation vector, a rotation quaternion, and a scale vector, linearly interpolating the translation vector, using a linear interpolation to interpolate the rotation quaternion to generate an interpolated rotation quaternion, linearly interpolating the scale vector to generate an interpolated scale vector, composing an interpolated translation-rotation-scale matrix based on the interpolated translation vector, the interpolated rotation quaternion, and the interpolated scale vector, and calculating an interpolated position for the interpolated first face using the interpolated translation-rotation-scale matrix. In some embodiments, the interpolation amount is derived from (a) a duration between the first face resampling keyframe and the second face resampling keyframe and (b) a current render time. In some embodiments, determining the second interpolated face frame includes calculating a respective displacement for each vertex in the second face landmark vertices.

BRIEF DESCRIPTION OF THE DRAWINGS

The disclosure is illustrated by way of example, and not by way of limitation in the figures of the accompanying drawings in which like reference numerals are used to refer to similar elements.

FIG. 4A illustrates an example of an input video frame of a video transmitted at 7.5 frames per second (FPS) according to some embodiments.

FIG. 4B illustrates an interpolated first face and an interpolated second face at 240 FPS according to some embodiments.

DETAILED DESCRIPTION

In some embodiments, a mobile device receives a set of video frames that correspond to a video. For example, the set of video frames may include a first video frame and a second video frame that each include a face. The second video frame may be subsequent to the first video frame. The mobile device may perform face tracking on the first video frame to identify a first face resampling keyframe where the first face resampling keyframe includes a first head transform matrix and first face landmark vertices. Face tracking may be performed on the second video frame to identify a second face resampling keyframe where the second face resampling keyframe includes a second head transform matrix and second face landmark vertices. An interpolation amount is derived. A first interpolated face frame is determined based on the first face resampling keyframe and the interpolation amount. A second interpolated face frame is determined based on the second face resampling keyframe and the interpolation amount. A first background of the first face resampling keyframe and a second background of the second face resampling keyframe are interpolated based on the interpolation amount. An interpolated first face and an interpolated second face are rendered. A final frame is displayed that is based on the interpolated first background, the interpolated second background, the interpolated first face, and the interpolated second face.

The various embodiments described below have several advantages. First, the processing is performed by the user device that displays the video. As a result, the video application uses reduced computational power to display video with a perceived higher frame rate. Second, the embodiments also provide higher frame rates than received video frame rate, even when the video is received with the use of end-to-end encryption between a sender device and a receiver device that displays the video. Third, the interpolation is computationally efficient because the structure of the video frames is interpolated and not the texture.

Example System

Figure 1:
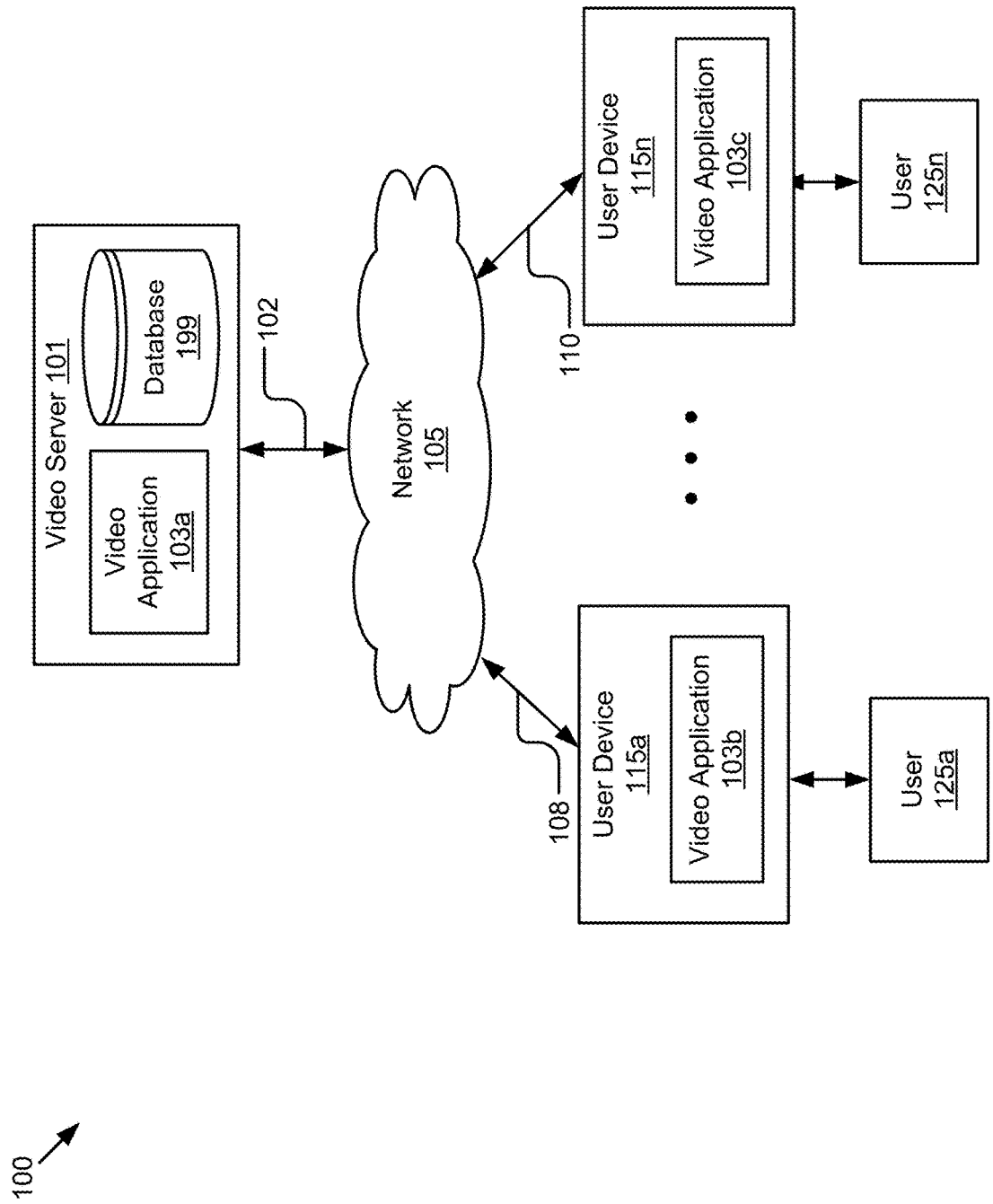
FIG. 1 illustrates a block diagram of an example environment in which interpolated video frames are generated according to some embodiments.

FIG. 1 illustrates a block diagram of an example environment 100 that generates interpolated video frames. The illustrated system 100 includes a video server 101, user devices 115a, 115n, and a network 105. Users 125a, 125n may be associated with respective user devices 115a, 115n. In some embodiments, the system 100 may include other servers or devices not shown in FIG. 1. In FIG. 1 and the remaining figures, a letter after a reference number, e.g., "115a," represents a reference to the element having that particular reference number. A reference number in the text without a following letter, e.g., "115," represents a general reference to embodiments of the element bearing that reference number.

The video server 101 may include a processor, a memory, and network communication capabilities. In some embodiments, the video server 101 is a hardware server. The video server 101 is communicatively coupled to the network 105 via signal line 102. Signal line 102 may be a wired connection, such as Ethernet, coaxial cable, fiber-optic cable, etc., or a wireless connection, such as Wi-Fi®, Bluetooth®, or other wireless technology. In some embodiments, the video server 101 sends and receives data to and from one or more of the user devices 115a, 115n via the network 105. The video server 101 may include a video application 103a and a database 199.

The video application 103a may include code and routines operable to receive video streams from one user device 115a and transmit the video streams to another user device 115n. For example, the video streams may be end-to-end encrypted, such that the video server 101 relays the video streams as data, with no video processing being performed. In some embodiments, the video application 103 may be implemented using hardware including a central processing unit (CPU), a field-programmable gate array (FPGA), an application-specific integrated circuit (ASIC), any other type of processor, or a combination thereof. In some embodiments, the video application 103 may be implemented using a combination of hardware and software.

The database 199 may store social network data associated with users 125, user preferences for the users 125, etc.

in situations in which the systems and methods discussed herein may collect or use personal information about users (e.g., user data, information about a user's social network, a user's location, a user's biometric information, a user's activities and/or demographic information, storage and analysis of video by the video application 103, etc.), users are provided with opportunities to control whether personal information is collected, whether the personal information is stored, whether the personal information is used, whether the images or videos are analyzed, and how information about the user is collected, stored, and used. That is, the systems and methods discussed herein may collect, store, and/or use user personal information only upon receiving explicit authorization from the relevant users to do so. For example, a user is provided with control over whether programs or features collect user information about that particular user or other users relevant to the program or feature. Each user for which personal information is to be collected is presented with one or more options to allow control over the information collection relevant to that user, to provide permission or authorization as to whether the information is collected and as to which portions of the information are to be collected. For example, users can be provided with one or more such control options over a communication network. In addition, certain data may be treated in one or more ways before it is stored or used so that personally identifiable information is removed. As an example, a user's geographic location may be generalized to a larger region so that the user's particular location cannot be determined.

The user device 115 may be a computing device that includes a memory and a hardware processor. For example, the user device 115 may include a desktop computer, a mobile device, a tablet computer, a mobile telephone, a wearable device, a head-mounted display, a mobile email device, a portable game player, a portable music player, a reader device, or another electronic device capable of accessing a network 105.

In the illustrated implementation, user device 115a is coupled to the network 105 via signal line 108 and user device 115n is coupled to the network 105 via signal line 110. Signal lines 108 and 110 may be wired connections, such as Ethernet, coaxial cable, fiber-optic cable, etc., or wireless connections, such as Wi-Fi®, Bluetooth®, or other wireless technology. User devices 115a, 115n are accessed by users 125a, 125n, respectively. The user devices 115a, 115n in FIG. 1 are used by way of example. While FIG. 1 illustrates two user devices, 115a and 115n, the disclosure applies to a system architecture having one or more user devices 115.

In some embodiments, the user device 115 can be a wearable device worn by the user 125. For example, the user device 115n is included as part of a clip (e.g., a wristband), part of jewelry, or part of a pair of glasses. In another example, the user device 115n can be a smart watch. The user 125n may view video generated by the video application 103c on a display of the user device 115n worn by the user 125n. For example, the video application 103c may display interpolated video frames on the user device 115n.

In some embodiments, the user device 115a may include a video application 103b that generates video for a video call. The user device 115a may transmit a video stream during the video call directly to the user device 115n over the network 105 or via the video server 101. The user device 115n may include a video application 103c that displays the video stream (one-way video) or within a video application executing on another device (two-way video or as part of a video calling application).

The user device 115n is a receiver device that includes the video application 103c. The user device 115n receives a set of video frames that correspond to a video. The video application 103c identifies a face and background in the frames, builds interpolated face frames, interpolates the background of the frames, renders interpolated faces, and displays a final frame that is based on interpolated faces and interpolated background in the frames.

In the illustrated implementation, the entities of the system 100 are communicatively coupled via a network 105. The network 105 may be a conventional type, wired or wireless, and may have numerous different configurations including a star configuration, token ring configuration or other configurations. Furthermore, the network 105 may include a local area network (LAN), a wide area network (WAN) (e.g., the Internet), and/or other interconnected data paths across which multiple devices may communicate. In some embodiments, the network 105 may be a peer-to-peer network. The network 105 may also be coupled to or include portions of a telecommunications network for sending data in a variety of different communication protocols. In some embodiments, the network 105 includes Bluetooth® communication networks, WiFi®, wireless local area network (WLAN) computer communication specified by IEEE 902.11, or a cellular communications network for sending and receiving data including via short messaging service (SMS), multimedia messaging service (MMS), hypertext transfer protocol (HTTP), direct data connection, email, etc. Although FIG. 1 illustrates one network 105 coupled to the user devices 115 and the video server 101, in practice one or more networks 105 may be coupled to these entities.

Example Computing Device

Figure 2:
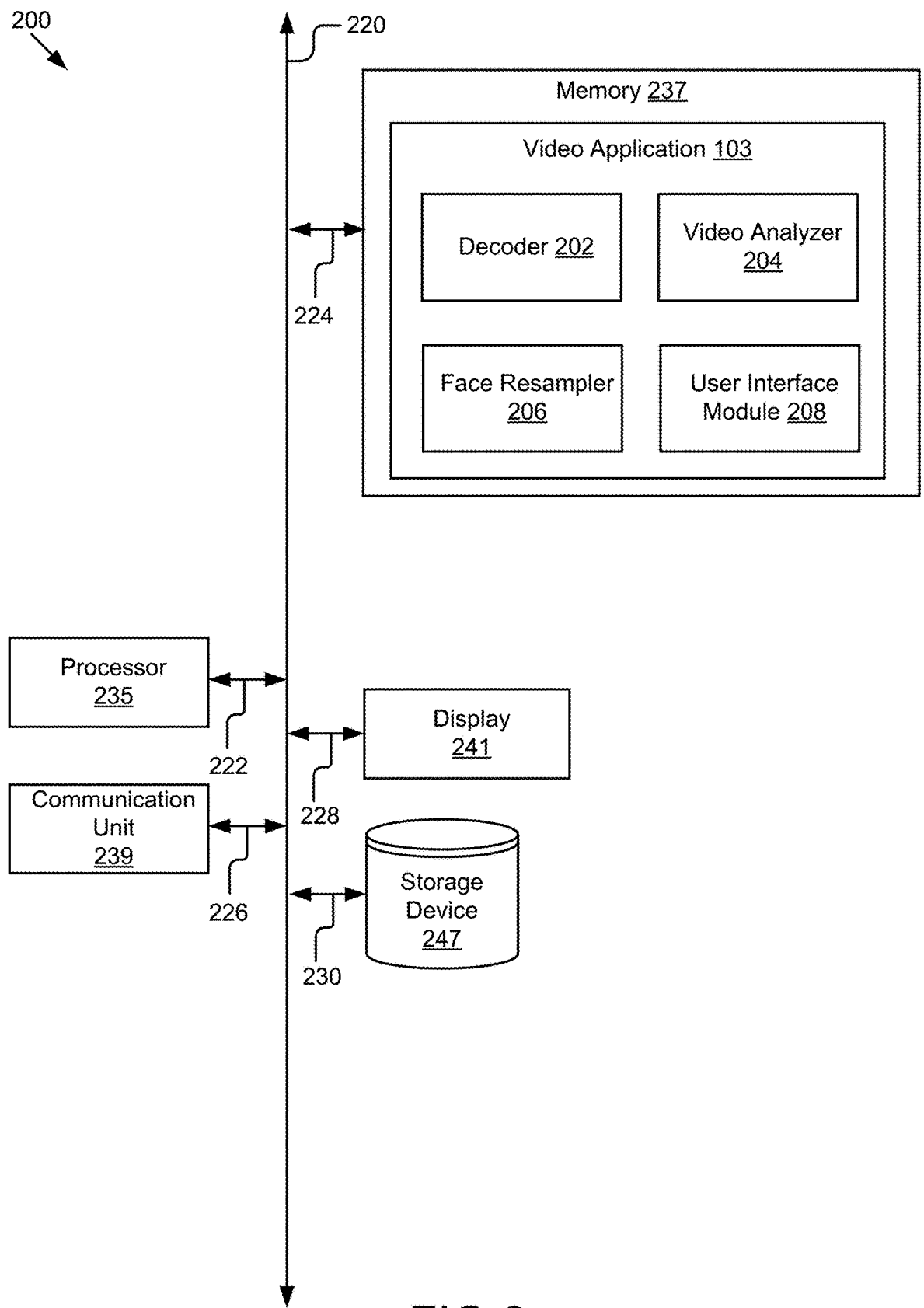
FIG. 2 illustrates a block diagram of an example computing device that generates interpolated video frames according to some embodiments.

FIG. 2 illustrates a block diagram of an example computing device 200 that generates interpolated video frames. The computing device 200 may be a user device 115 or a video server 101. The computing device 200 may include a processor 235, a memory 237, a communication unit 239, a display 241, and a storage device 247. Additional components may be present or some of the previous components may be omitted depending on the type of computing device 200. A video application 103 may be stored in the memory 237. In some embodiments, the computing device 200 may include other components not listed here, such as a battery, etc. The components of the computing device 200 may be communicatively coupled by a bus 220.

The processor 235 includes an arithmetic logic unit, a microprocessor, a general-purpose controller, or some other processor array to perform computations and provide instructions to a display device. Processor 235 processes data and may include various computing architectures including a complex instruction set computer (CISC) architecture, a reduced instruction set computer (RISC) architecture, or an architecture implementing a combination of instruction sets. Although FIG. 2 includes a single processor 235, multiple processors 235 may be included. Other processors, operating systems, sensors, displays, and physical configurations may be part of the computing device 200. The processor 235 is coupled to the bus 220 for communication with the other components via signal line 222.

The memory 237 stores instructions that may be executed by the processor 235 and/or data. The instructions may include code for performing the techniques described herein. The memory 237 may be a dynamic random access memory (DRAM) device, a static RAM, or some other memory device. In some embodiments, the memory 237 also includes a non-volatile memory, such as a static random access memory (SRAM) device or flash memory, or similar permanent storage device and media including a hard disk drive, a compact disc read only memory (CD-ROM) device, a DVD-ROM device, a DVD-RAM device, a DVD-RW device, a flash memory device, or some other mass storage device for storing information on a more permanent basis. The memory 237 includes code and routines operable to execute the video application 103, which is described in greater detail below. The memory 237 is coupled to the bus 220 for communication with the other components via signal line 224.

The communication unit 239 transmits and receives data to and from at least one of the user devices 115 and the video server 101. In some embodiments, the communication unit 239 includes a wireless transceiver for exchanging data with the user device 115, video server 101, or other communication channels using one or more wireless communication methods, including IEEE 802.11, IEEE 802.16, Bluetooth® or another suitable wireless communication method. The communication unit 239 is coupled to the bus 220 for communication with the other components via signal line 226.

In some embodiments, the communication unit 239 includes a cellular communications transceiver for sending and receiving data over a cellular communications network including via short messaging service (SMS), multimedia messaging service (MMS), hypertext transfer protocol (HTTP), direct data connection, e-mail or another suitable type of electronic communication. In some embodiments, the communication unit 239 includes a wired port and a wireless transceiver. The communication unit 239 also provides other conventional connections to the network 105 for distribution of files and/or media objects using standard network protocols including, but not limited to, user datagram protocol (UDP), TCP/IP, HTTP, HTTP secure (HTTPS), simple mail transfer protocol (SMTP), SPDY, quick UDP internet connections (QUIC), etc. The communication unit 239 is coupled to the bus 220 for communication with the other components via signal line 226.

The display 241 may include hardware operable to display graphical data received from the video application 103. For example, the display 241 may render graphics to display video frames for a video. Display 241 may be any type of display, e.g., a liquid crystal display (LCD), OLED, etc. In some embodiments, display 241 may be a projected screen. In some embodiments, e.g., when device 241 is an augmented reality device, display 241 may be a stereoscopic display. The display 241 is coupled to the bus 220 for communication with the other components via signal line 228.

The storage device 247 may be a non-transitory computer-readable storage medium that stores data that provides the functionality described herein. In embodiments where the computing device 200 is the video server 101, the storage device 247 may include the database 199 in FIG. 1. The storage device 247 may be a DRAM device, a SRAM device, flash memory or some other memory device. In some embodiments, the storage device 247 also includes a non-volatile memory or similar permanent storage device and media including a hard disk drive, a CD-ROM device, a DVD-ROM device, a DVD-RAM device, a DVD-RW device, a flash memory device, or some other mass storage device for storing information on a permanent basis. The storage device 247 is coupled to the bus 220 for communication with the other components via signal line 230.

The video application 103 may include a decoder 202, a video analyzer 204, a face resampler 206, and a user interface module 208.

The decoder 202 decodes encoded video frames. In some embodiments, the decoder 202 includes a set of instructions executable by the processor 235 to decode encoded video frames, e.g., received from a sender device that participates in a video call with the computing device 200. In some embodiments, the decoder 202 is stored in the memory 237 of the computing device 200 and can be accessible and executable by the processor 235.

In some embodiments, the decoder 202 receives a set of encoded video frames via the communication unit 239. The decoder 202 decodes the video frames, for example, by decrypting (e.g., when the video is encrypted) and decompressing the encoded video frames. Once the decoder 202 decodes the video frames, in conventional video processing, the video frames are typically rendered for display. However, per techniques described herein, the decoder 202 skips scheduling of the video frames for presentation, e.g., when the frame rate of the received video is lower than a frame rate for the video application 103. As a result, instead of scheduling the video frames for presentation, the decoder 202 provides each of the decoded video frames to the video analyzer 204. For example, the set of video frames includes a first video frame and a second video frame, where the second video frame is subsequent to the first video frame, e.g., is associated with a timestamp that is later than a timestamp associated with the first video frame, such that the second video frame occupies a later position in a chronological sequence of frames than the first video frame. In some embodiments, the second video frame directly follows the first video frame, for example, the two frames are identified for sequential display with no other frames in between.

The video analyzer 204 performs face tracking. In some embodiments, the video analyzer 204 includes a set of instructions executable by the processor 235 perform face tracking. In some embodiments, the video analyzer 204 is stored in the memory 237 of the computing device 200 and can be accessible and executable by the processor 235.

The video analyzer 204 runs at a frequency with a tick signal (clock signal) that is independent of the video frame rate of the user device 115. For example, the video analyzer 204 runs at a frequency of 60 Hertz and there is a separate clock running at 60 Hz that is linked to a refresh/render loop for displaying video frames.

The video analyzer 204 receives the set of decoded video frames and, for each frame, identifies a background and a face in the decoded video frame. For example, the video analyzer 204 identifies a first background and a face in the first video frame and a second background and the face in the second video frame. The video analyzer 204 may distinguish between the face and the background in a frame by applying a face-tracking technique. For example, the video analyzer 204 may apply a red green blue (RGB) face tracking technique that identifies a face resampling keyframe, texture coordinates of the face resampling keyframe (e.g., RGB texture), and a timestamp for the video frame.

In some embodiments, the face resampling keyframe includes two values: a head transform matrix and a set of landmark vertices. The head transform matrix is a 4×4 matrix, M, that represents a head transform. The head transform matrix transforms to the face space (which includes translation, rotation, and scaling) from an arbitrary initial model space (initial position, orientation, and scale). A set of landmark vertices, V, describes the set of landmark vertices in face space.

In some embodiments, the video analyzer 204 uses machine learning to perform real-time face tracking of the set of decoded video frames. In some embodiments, trained models may be trained, e.g., based on training data, for which permissions to utilize user data for training have been obtained expressly from users. The training data may include any data, such as videos and corresponding metadata, that is permitted for use for training, such as synthetic or computer-generated data, data licensed for use for training, etc. The training data may include images and videos where a face resampling keyframe has been identified in the images and video frames. The images and videos may come from video stored on the database 199 of the video server 101.

In some embodiments, a trained model may be obtained based on supervised learning, for example, based on training data including images and videos and corresponding metadata. For example, a trained model may include model form or structure (e.g., descriptive of a number and organization of a plurality of nodes into layers of a neural network, with associated weights). In some embodiments, the model may be trained to detect and track faces in a video. For example, a video may be provided and data indicative of face position (e.g., facial landmarks) may also be provided as input to an untrained model. The model may be trained (using supervised learning) to predict the facial landmarks. The model may be utilized to detect facial landmarks in a video and the predicted landmark locations may be compared with groundtruth data. A difference between the two may be computed and provided as training feedback. Weights of one or more neural network nodes or other parameters of the model may be adjusted based on the feedback. Training may be completed when the model predictions meet an accuracy threshold.

In some embodiments, users help create the training data by providing user input. Users may be asked to identify the location of the face within the video frames. As a result of user input, the training data may have accurate identification about the location of the face and use it to determine a face resampling keyframe for the video frame. In this example, and the other examples of identifying the location of the face, face detection does not include determining identity, e.g., no facial recognition is performed. In addition, the training data may be representative of use context, for example, where the use context is detecting faces in video calls conducted using module devices.

Based on the training data, the video analyzer 204 may include a trained model that can generate, based on images and videos, the face resampling keyframe. The trained model may be a temporal action localization model. In various embodiments, the video analyzer 204 may use Bayesian classifiers, support vector machines, neural networks, or other learning techniques to implement the trained model.

In some embodiments, the trained model may include one or more model forms or structures. For example, model forms or structures can include any type of neural-network, such as a linear network, a deep neural network that implements a plurality of layers (e.g., "hidden layers" between an input layer and an output layer, with each layer being a linear network), a convolutional neural network (e.g., a network that splits or partitions input data into multiple parts or tiles, processes each tile separately using one or more neural-network layers, and aggregates the results from the processing of each tile), a sequence-to-sequence neural network (e.g., a network that takes as input sequential data, such as words in a sentence, frames in a video, etc. and produces as output a result sequence), etc. The model form or structure may specify connectivity between various nodes and organization of nodes into layers. For example, nodes of a first layer (e.g., input layer) may receive data as input data or application data. Such data can include, for example, one or more pixels per node, e.g., when the trained model is used for image analysis. Subsequent intermediate layers may receive as input output of nodes of a previous layer per the connectivity specified in the model form or structure. These layers may also be referred to as hidden layers. A final layer (e.g., output layer) produces an output of the face resampling keyframe and other metadata. For example, the output may be the face resampling keyframe, texture coordinates for the face resampling keyframe, and a timestamp of the video frame. In some embodiments, model form or structure also specifies a number and/or type of nodes in each layer.

In different embodiments, a trained model can include a plurality of nodes, arranged into layers per the model structure or form. In some embodiments, the nodes may be computational nodes with no memory, e.g., configured to process one unit of input to produce one unit of output. Computation performed by a node may include, for example, multiplying each of a plurality of node inputs by a weight, obtaining a weighted sum, and adjusting the weighted sum with a bias or intercept value to produce the node output. In some embodiments, the computation performed by a node may also include applying a step/activation function to the adjusted weighted sum. In some embodiments, the step/activation function may be a non-linear function. In various embodiments, such computation may include operations such as matrix multiplication. In some embodiments, computations by the plurality of nodes may be performed in parallel, e.g., using multiple processors cores of a multicore processor, using individual processing units of a general processing unit or special-purpose neural circuitry. In some embodiments, nodes may include memory, e.g., may be able to store and use one or more earlier inputs in processing a subsequent input. For example, nodes with memory may include long short-term memory (LSTM) nodes. LSTM nodes may use the memory to maintain "state" that permits the node to act like a finite state machine (FSM). Models with such nodes may be useful in processing sequential data, e.g., frames in a video.

In some embodiments, a trained model may include embeddings or weights for individual nodes. For example, a trained model may be initiated as a plurality of nodes organized into layers as specified by the model form or structure. At initialization, a respective weight may be applied to a connection between each pair of nodes that are connected per the model form, e.g., nodes in successive layers of the neural network. For example, the respective weights may be randomly assigned, or initialized to default values. The trained model may then be trained, e.g., using data, to produce a result.

The face resampler 206 generates interpolated face frames. In some embodiments, the resampler 206 includes a set of instructions executable by the processor 235 to generate the interpolated face frames. In some embodiments, the recognition module 206 is stored in the memory 237 of the computing device 200 and can be accessible and executable by the processor 235.

In some embodiments, the face resampler 206 is associated with a limited size queue or a buffer that stores the face resampling keyframe, the texture coordinates, and the timestamp of a video frame. In some embodiments, the buffer has limited storage capacity and the face resampler 206 removes the old face resampling keyframes each time new ones are stored. For example, the interpolated frames may be generated using two face resampling keyframes. Other examples are possible, such as three or four resampling keyframes to account for the rate of motion of the subject between video frames.

For each instance where a render of a video frame is to occur, the face resampler 206 generates an interpolation amount, t, from the duration between the face resampling keyframes (i.e., the time that each frame would normally display for and the current render time relative to that duration. For example, the face resampler 206 generates an interpolation amount, t, that is between 0 and 1 based on a current render time and a frame duration, which is defined as the time between a first face resampling keyframe and a second face resampling keyframe. In some embodiments, the interpolation amount is defined as:

$$t = \frac{(\text{current}_{time} - \text{previous}_{time})}{(\text{next}_{time} - \text{previous}_{time})} \qquad \text{Eq. 1}$$

In other words, the interpolation amount is a number between 0 and 1 that expresses a relative distance in time of the interpolated face frame between a first and a second video frame.

The face resampler 206 performs interpolation that includes application of an interpolation algorithm to (1) decompose the face resampling keyframes using the head transform matrices to extract a translation vector, a rotation quaternion, and a scale vector; (2) linearly interpolate the translation vectors; (3) use spherical linear interpolation to interpolate the rotation quaternion to generate an interpolated rotation quaternion; (4) linearly interpolate the scale vectors to generate an interpolated scale vector; (5) compose an interpolated translation-rotation-scale matrix; (6) calculate new interpolated positions for interpolated frames; and (7) use an interpolated vertex to render interpolated face frames (i.e., upsampled frames).

The face resampler 206 may decompose the first face resampling keyframe and the second face resampling keyframe. For example, the face resampler 206 decomposes the first face resampling keyframe using a head transform matrix M_first and decomposes the second face resampling keyframe using a head transform matrix M_second.to determine: (1) the translation vectors with x, y, and z coordinates for the first face resampling keyframe, T_first, and for the second face resampling keyframe, T_second; (2) the rotation quaternion for x, y, z, and w coordinates for the first face resampling keyframe, R_first and for the second face resampling keyframe, R_second; and (3) the scale vector for x, y, and z coordinates for the first face resampling keyframe, S_first and for the second face resampling keyframe, S_second.

In some embodiments, the face resampler 206 linearly interpolates the translation vectors for the first face resampling keyframe, T_first, and for the second face resampling keyframe, T_second to generate the interpolated translation vector using the following equation:

$$T_{interpolated} = T_{first}*(1.0-t) + T_{second}*t \qquad \text{Eq. 2}$$

In some embodiments, the face resampler 206 uses spherical linear interpolation (SLERP) to interpolate R_first and R_second to generate an interpolated rotation quaternion using the following equation:

$$R_{interpolated} = \text{SLERP}(R_{first}, R_{second}, t) \qquad \text{Eq. 3}$$

In some embodiments, the face resampler 206 linearly interpolates the scale vectors S_first and S_second to generate an interpolated scale vector using the following equation:

$$S_{interpolated} = S_{first}*(1.0-t) + S_{second}*t \qquad \text{Eq. 4}$$

In some embodiments, the face resampler 206 composes an interpolated translation-rotation-scale matrix, which transforms from model space to face space, from the above interpolated values using the following equation:

$$M_{interpolated} = \text{TranslationMatrix}(T_{interpolated})*\text{RotationMatrix}(R_{interpolated})*\text{ScaleMatrix}(S_{interpolated}) \qquad \text{Eq. 5}$$

In some embodiments, the face resampler 206 calculates, for each vertex v_first in V_first (first face landmark vertices) and v_second in V_second (second face landmark vertices), the new interpolated positions for a first interpolated frame and a second interpolated frame by calculating a linearly interpolated model space vertex that includes inside-face movements (e.g., smiling, raising eyebrows) that are not included in the overall transform using the following equations:

$$v_{first\ model\ space} = \text{Inverse}(M_{first})*v_{first} \qquad \text{Eq. 6}$$

$$v_{second\ model\ space} = \text{Inverse}(M_{second})*v_{second} \qquad \text{Eq. 7}$$

$$v_{interpolated\ model\ space} = v_{first\ model\ space}*(1.0-t) + v_{second\ model\ space}*t \qquad \text{Eq. 8}$$

In some embodiments, the face resampler 206 calculates anew interpolated face space vertex that is shared between the first frame and the second frame using the following equation:

$$v_{interpolated} = M_{interpolated}*v_{interpolated\ model\ space}$$

In some embodiments, the face resampler 206 uses the interpolated face space vertex to render upsampled frames.

The face resampler 206 generates interpolated face frames for each face resampling key frame where the texture coordinates in each interpolated face frame are equal to the texture coordinates from its respective face resampling keyframe. The landmark vertices are interpolated according to the interpolated amount to create interpolated mesh vertices. The interpolated mesh vertices are a composition of the interpolated head transform matrix and the mesh vertices from the face resampling keyframe. The landmark vertices are identical between each interpolated face frame, but different texture coordinates are applied to the landmark vertices because the texture coordinates correspond to the respective face resampling keyframes. For example, the face resampler 206 creates a first interpolated face frame for the first face resampling keyframe and a second interpolated face frame for the second face resampling keyframe. This effectively stretches the face in the first video frame and the face in the second video frame to coincide at an identical intermediate position.

Figure 3B:
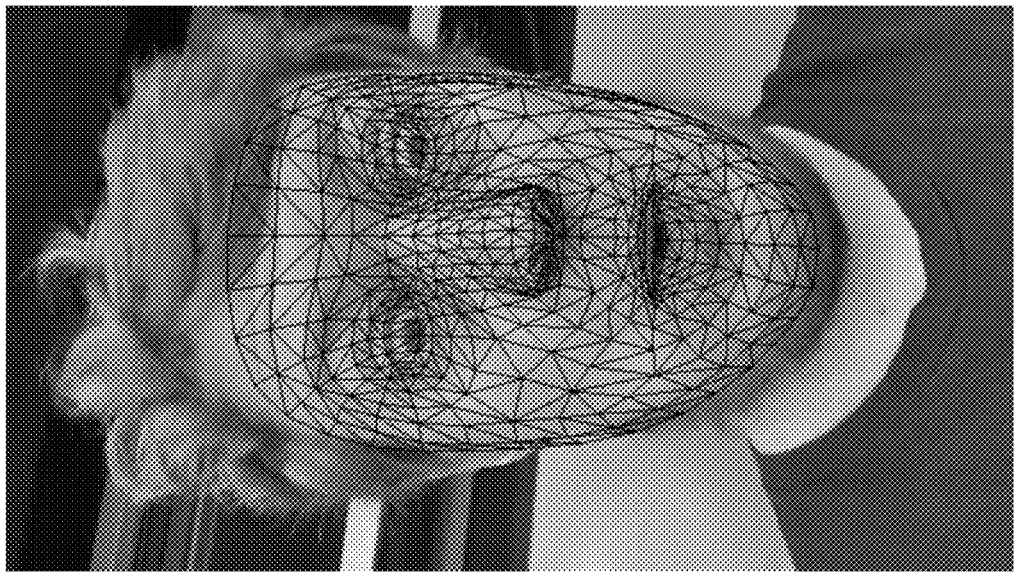
FIG. 3B illustrates an example of a first face resampling keyframe according to some embodiments.
Figure 3A:
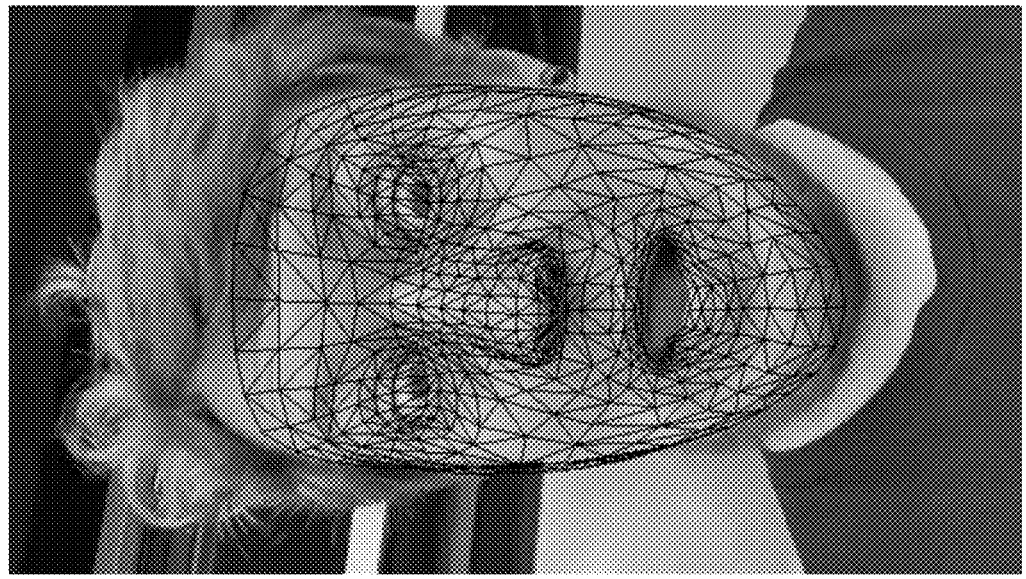
FIG. 3A illustrates an example of a first face resampling keyframe according to some embodiments.

Turning to FIG. 3A, an example of a first face resampling keyframe 300 is illustrated. This is the input to the interpolation algorithm for time=0. FIG. 3B illustrates an example of a second face resampling keyframe 325. This is the input to the interpolation algorithm for time=1. As can be seen in the figures, the landmark vertices (points of intersection of the mesh) in FIGS. 3A and 3B are different. For example, in FIG. 3A the mouth is wide open and in FIG. 3B the face is slightly rotated and the mouth is less open as compared to FIG. 3A, which causes the corresponding vertices to be at different positions.

Figure 3D:
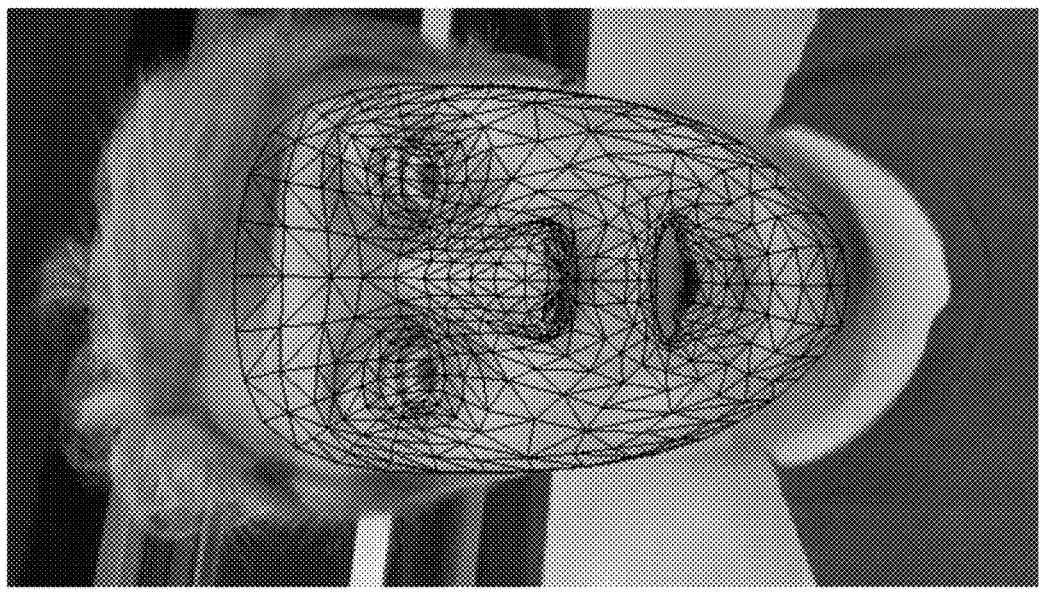
FIG. 3D illustrates an output image with texture from a second frame warped based on an interpolated mesh according to some embodiments.
Figure 3C:
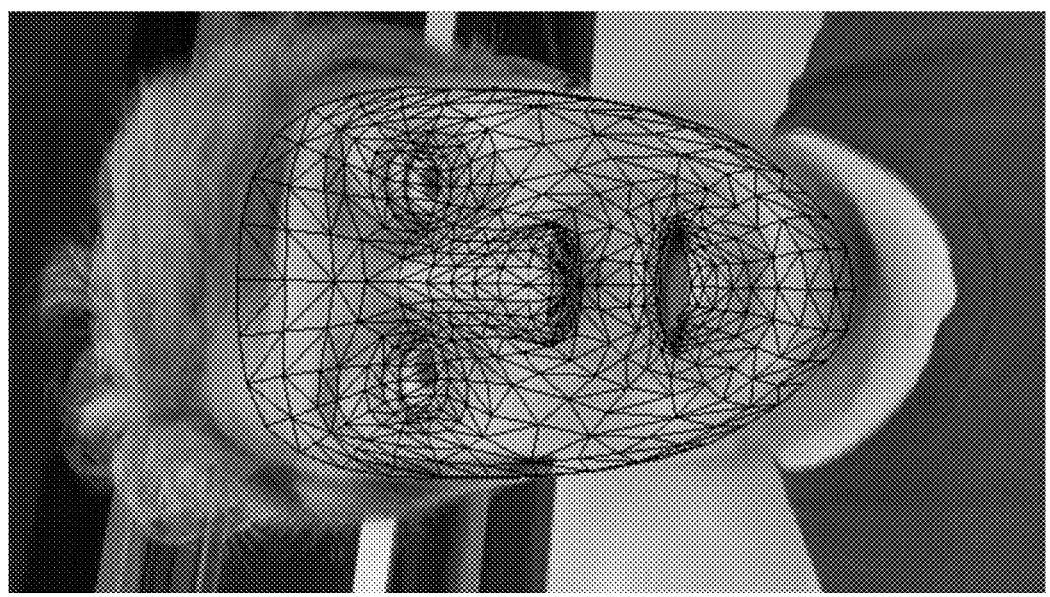
FIG. 3C illustrates an output image with texture from a first frame warped based on an interpolated mesh according to some embodiments.

FIG. 3C illustrates an output image 350 with texture from a first face resampling keyframe warped based on an interpolated mesh without blending. FIG. 3D illustrates an output image 375 with texture from a second face resampling keyframe warped based on an interpolated mesh without blending. The landmark vertices in FIGS. 3C and 3D are identical, but have different textures coordinates applied because the texture varies between the two frames.

Turning to FIG. 4A, an example of an input video frame 400 of a video transmitted at 7.5 FPS is illustrated. FIG. 4B illustrates an interpolated first face 425 and an interpolated second face 430 at 240 FPS according to some embodiments.

In some embodiments, the face resampler 206 interpolates a first background of the first face resampling keyframe and a second background of the second face resampling keyframe based on the interpolation amount. The face resampler 206 may determine the first background and the second background based on the location of the face in the first frame and the second frame as determined by the face tracking algorithm. The face resampler 206 may interpolate the backgrounds of the keyframes using alpha blending. In some embodiments, blending may include fading between the first background and the second background such that when frames are displayed sequentially at a high frame rate, the upcoming smooth face drawn on top is visually less jarring to a viewer. In some embodiments, performing the interpolation may include buffering at least two frames for interpolation. Due to such buffering, in some embodiments, playback of the video includes a one-frame delay being introduced into the video stream.

Figure 5B:
FIG. 5B illustrates a video frame at 240 FPS with fading to prepare for an upcoming smooth face to be drawn on top according to some embodiments.
Figure 5A:
FIG. 5A illustrates an example of an input video frame of a video transmitted at 7.5 FPS according to some embodiments.

Turning to FIG. 5A, an example of an input video frame 500 at 7.5 FPS is illustrated according to some embodiments. FIG. 5B illustrates a video frame 525 at 240 FPS with fading of the background to prepare for an upcoming smooth face to be drawn on top.

The face resampler 206 renders the first interpolated face and the second interpolated face. In some embodiments, the face resampler 206 performs at least one of feathering of the edges of the face (which can make the edges of the interpolated face frame less noticeable to a viewer) and fading between the first interpolated face frame and the second interpolated face frame, depending on the interpolation amount.

Figure 6B:
FIG. 6B illustrates an example blended frame without a background, that is rendered at 240 FPS, and that is based on a first interpolated face frame and a second interpolated face frame that is rendered at 240 FPS according to some embodiments.
Figure 6A:
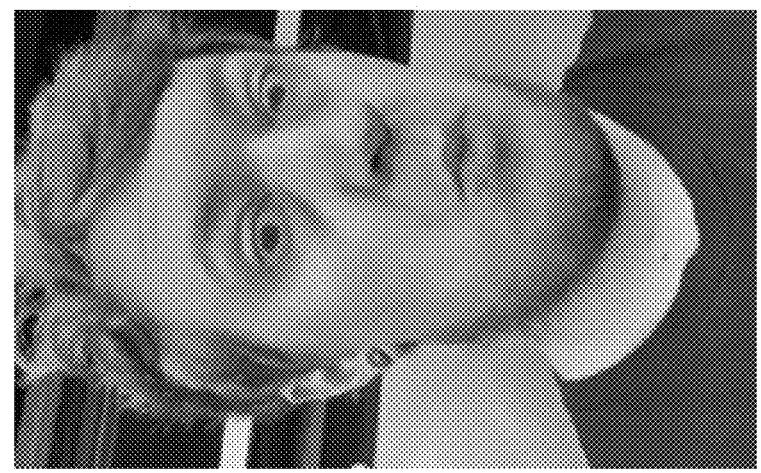
FIG. 6A illustrates an example of an input video frame of a video transmitted at 7.5 FPS according to some embodiments.

Turning to FIG. 6A, an example of an input video frame 600 at 7.5 FPS is illustrated according to some embodiments. FIG. 6B illustrates an example blended face frame 625 that is blended from a first interpolated face frame and a second interpolated face frame. The blended face frame (along with other blended frames) is rendered at 240 FPS and is shown in FIG. 6B without the background for purposes of illustration. In the example shown in FIG. 6B, the face resampler 206 performed at least one of feathering and fading to make the smooth face.

The face resampler 206 instructs the display 241 to display a final frame that is based on an interpolated first background, an interpolated second background, the interpolated first face, and the interpolated second face. For example, the face resampler 206 places a smooth face on top of the blended face frame with the blended background that is generated from fading between the first background and the second background. The face resampler 206 uses the face tracking information to align the smooth face with the blended face frame while maintaining the feathering of the blended face frame.

Figure 7B:
FIG. 7B illustrates a final frame that is displayed on a user device according to some embodiments.
Figure 7A:
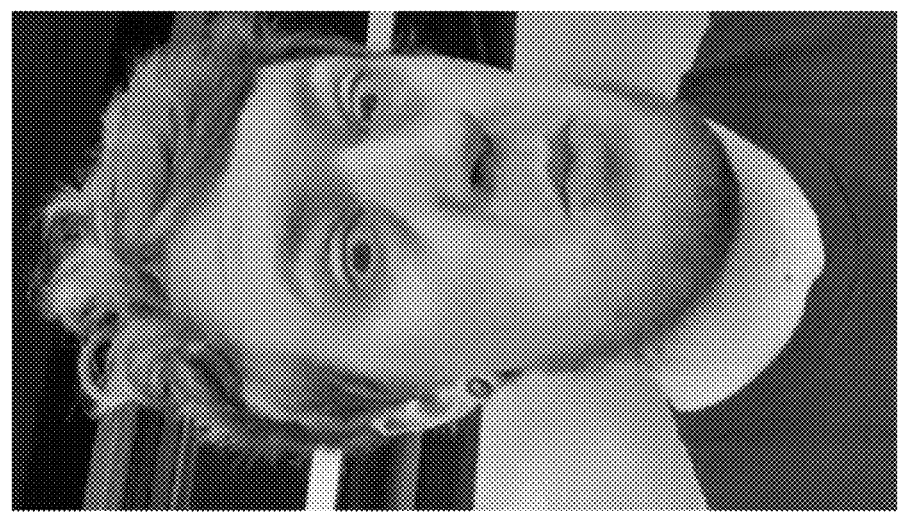
FIG. 7A illustrates an example of an input video frame of a video transmitted at 7.5 FPS according to some embodiments.

Turning to FIG. 7A, an example of an input video frame 700 at 7.5 FPS is illustrated. FIG. 7B illustrates a final frame 725 that is displayed by the user device 115. The final frame 725 is an example of a blended face frame combined with a blended background. As a result of the insertion of one or more blended face frames as intermediate frames between the first frame and the second frame, the perceived frame rate when the video is displayed is higher and results in a positive user experience because quality of the video is improved (e.g., sudden motion transitions that can be perceived at lower frames are no longer perceptible) without the sender device needing to send video streams at the high frame rate, which requires greater network bandwidth. For example, generation of interpolated frames as described herein enables a received video stream of a low frame rate (e.g., 7.5 FPS) to be played back at a higher frame rate (e.g., 30 FPS, 60 FPS, 240 FPS, etc.) by inserting the interpolated frames between consecutive frames of the received video.

Figure 8:
FIG. 8 illustrates two sequences of frames, one at a low framerate without interpolation and one at a higher framerate, where the additional frames are interpolated and added to the sequence of frames according to some embodiments.

Turning to FIG. 8, two sequences of frames are illustrated. Frame sequence 810 is from the original video and includes frames 811, 812, 813, 814, 815, 816, 817, 818, and 819. When the video is transmitted at a low frame rate, only frames 811, 815, and 819 are included for display at a low framerate without interpolation. Frames 812, 813, 814, 816, 817, and 818 are not included. This is problematic because when the video is displayed, the user can perceive sudden movement, for example, that the video has jumps between the frames, such as when the person's mouth is suddenly closed between frames 811 and 815 and where the eyes change dramatically between frames 815 and 819.

Frame sequence 820 includes upsampled video and includes frames 811, 822, 823, 824, 815, 826, 827, 828, and 819, which are displayed at a higher framerate. From the received video stream that includes frames 811, 815, and 819, additional frames are obtained by interpolation, as described herein. The additional frames in frame sequence 820 are 822, 823, 824, 826, 827, and 828, and are obtained by interpolation and added to the sequence according to the techniques described herein. As a result of using interpolated frames, the frame sequence 820 can be displayed at a higher framerate (since intermediate frames 822-824 and 826-828 are available) with no jumpiness while the bandwidth utilized to receive the video remains the same as that for frame sequence 810.

The user interface module 208 generates graphical data for displaying a user interface. In some embodiments, the user interface module 208 includes a set of instructions executable by the processor 235 to generate the graphical data. In some embodiments, the user interface module 208 is stored in the memory 237 of the computing device 200 and can be accessible and executable by the processor 235.

In some embodiments, the user interface module 208 generate graphical data for displaying the video with a perceived higher frame rate, e.g., by inserting interpolated frames obtained from face resampler 206 in between consecutive frames of the received video. In some embodiments, the user interface module 208 also generates user interface options associated with a video application. For example, the user interface includes options for conducting the video call, adding other users to the video call, changing settings associated with the video call, etc.

In some embodiments, the number of intermediate frames that are generated between the first frame and the second frame is based on a difference in the frame rate of the received video and the frame rate at which the video is to be played back. For example, if the video is received at 10 FPS and is to be played by at 30 FPS, 2 intermediate frames are generated for each pair of consecutive frames of the video. In this instance, if the original video has 100 frames (corresponding to 10 seconds of video), 200 intermediate frames are generated to obtain a video of 300 frames which can be played back at 30 FPS for 10 seconds of video. The frame rate for video playback may be selected based on various factors, e.g., the refresh rate of display 241, the computational capabilities of device 200, the rate of motion in the received video, etc.

Example Method

Figure 9A:
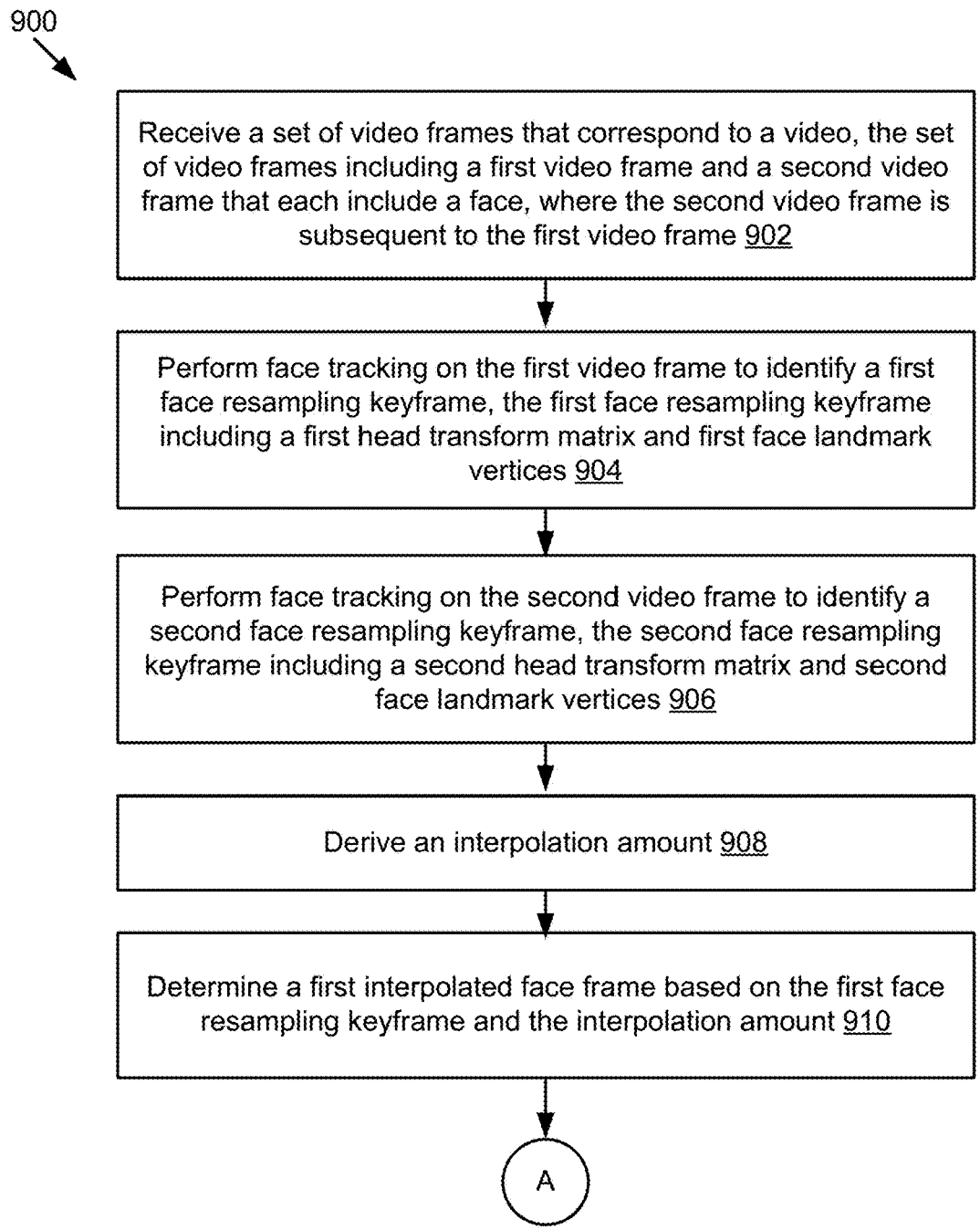
FIGS. 9A and 9B illustrate a flowchart of an example method to generate interpolated video frames according to some embodiments.
Figure 9B:
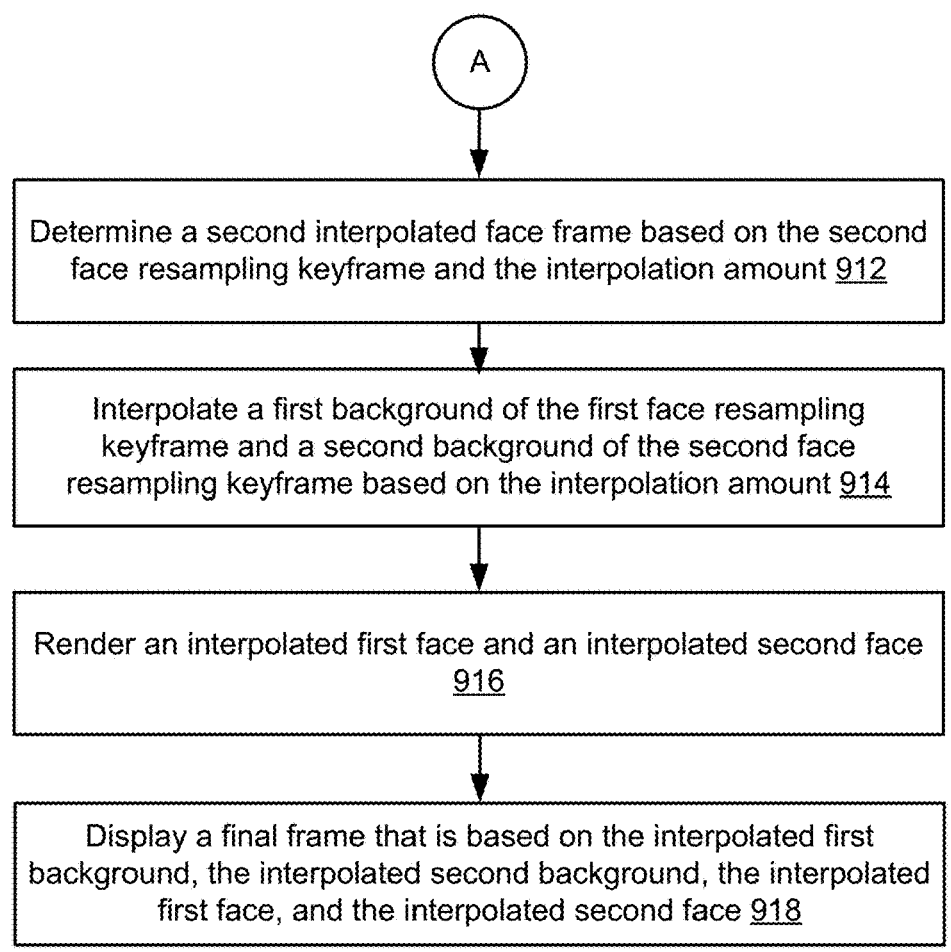

FIGS. 9A and 9B illustrate a flowchart of an example method to generate interpolated video frames. The method 900 is performed by a video application 103 stored on a computing device 200, such as a user device 115, a video server 101, or in part a user device 115 and in part a video server 101.

At block 902, a set of video frames are received that correspond to a video. The set of video frames include a first video frame and a second video frame that each include a face, where the second video frame is subsequent to the first, e.g., a timestamp associated with the second video frame has a value higher than a timestamp associated with the first video frame, such that during playback of the video, the first frame is displayed prior to displaying the second frame.

At block 904, face tracking is performed on the first video frame to identify a first face resampling keyframe, the first face resampling keyframe including a first head transform matric and first face landmark vertices. At block 906, face tracking is performed on the second video frame to identify a second face resampling keyframe, the second face resampling keyframe including a second head transformation matrix and second face landmark vertices.

At block 908, an interpolation amount is derived. At block 910, a first interpolated face frame is determined based on the first face resampling keyframe and the interpolation amount. At block 912, a second interpolated face frame is determined based on the second face resampling keyframe and the interpolation amount. At block 914, a first background of the first face resampling keyframe and a second background of the second face resampling keyframe are interpolated based on the interpolation amount. In some implementations, block 914 may be omitted. At block 916, an interpolated first face and an interpolated second face are rendered. For example, the interpolated first face and the interpolated second face are rendered as a blended interpolated face. At block 918 a final frame is displayed that is based on the interpolated first background, the interpolated second background, the interpolated first face, and the second interpolated second face. For example, the blended interpolated face is added to a blended background to form the final frame. The final frame is inserted at a corresponding position in a sequence of frames, e.g., between the first video frame and the second video frame, such that during playback, the first frame, the final frame, and the second frame are displayed sequentially. If more than one interpolated frame is generated between the first video frame and the second video frame (e.g., when the interpolation amount is lower than t) to enable playback at higher frame rates (e.g., to obtain 30 frames per second from a 10 frames per second video), each interpolated frame is inserted at a corresponding position in the sequence.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the embodiments can be described above primarily with reference to user interfaces and particular hardware. However, the embodiments can apply to any type of computing device that can receive data and commands, and any peripheral devices providing services.

Reference in the specification to "some embodiments" or "some instances" means that a particular feature, structure, or characteristic described in connection with the embodiments or instances can be included in at least one implementation of the description. The appearances of the phrase "in some embodiments" in various places in the specification are not necessarily all referring to the same embodiments.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic data capable of being stored, transferred, combined, compared, and otherwise manipulated. It has proven convenient at times, principally for reasons of common usage, to refer to these data as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The embodiments of the specification can also relate to a processor for performing one or more steps of the methods described above. The processor may be a special-purpose processor selectively activated or reconfigured by a computer program stored in the computer. Such a computer program may be stored in a non-transitory computer-readable storage medium, including, but not limited to, any type of disk including optical disks, ROMs, CD-ROMs, magnetic disks, RAMs, EPROMs, EEPROMs, magnetic or optical cards, flash memories including USB keys with non-volatile memory, or any type of media suitable for storing electronic instructions, each coupled to a computer system bus.

The specification can take the form of some entirely hardware embodiments, some entirely software embodiments or some embodiments containing both hardware and software elements. In some embodiments, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

In situations in which the systems discussed above collect or use personal information, the systems provide users with an opportunity to control whether programs or features collect user information (e.g., information about a user's social network, social actions or activities, profession, a user's preferences, or a user's current location), or control whether and/or how to receive content from the server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the server.

What is claimed is:

1. A computer-implemented method comprising:
receiving a set of video frames that correspond to a video, the set of video frames including a first video frame and a second video frame that each include a face, wherein the second video frame is subsequent to the first video frame;
performing face tracking on the first video frame to identify a first face resampling keyframe;
performing face tracking on the second video frame to identify a second face resampling keyframe;
deriving an interpolation amount;
interpolating a first background of the first face resampling keyframe and a second background of the second face resampling keyframe based on the interpolation amount;
rendering an interpolated first face and an interpolated second face; and
displaying a final frame that is based on the interpolated first background, the interpolated second background, the interpolated first face, and the interpolated second face.

2. The method of claim 1, further comprising:
blending the first background with the second background to obtain a blended background;
blending the interpolated first face with the interpolated second face to obtain a blended interpolated face; and
generating the final frame by placing a smooth face on top of the blended interpolated face and the blended background.

3. The method of claim 1, wherein the first face resampling keyframe includes a first head transform matrix and first face landmark vertices and further comprising determining a first interpolated face frame by:
using the first head transform matrix to extract a translation vector, a rotation quaternion, and a scale vector;
linearly interpolating the translation vector;
using a linear interpolation to interpolate the rotation quaternion to generate an interpolated rotation quaternion;
linearly interpolating the scale vector to generate an interpolated scale vector;
composing an interpolated translation-rotation-scale matrix based on the interpolated translation vector, the interpolated rotation quaternion, and the interpolated scale vector; and
calculating an interpolated position for the interpolated first face using the interpolated translation-rotation-scale matrix.

4. The method of claim 1, wherein the interpolation amount is derived from (a) a duration between the first face resampling keyframe and the second face resampling keyframe and (b) a current render time.

5. The method of claim 1, wherein the second face resampling keyframe includes a second head transform matrix and second face landmark vertices, and further comprising determining a second interpolated face frame by calculating a respective displacement for each vertex in the second face landmark vertices.

6. The method of claim 1, wherein the interpolating the first background and the second background is done with alpha blending.

7. The method of claim 1, wherein the rendering includes at least one of feathering of edges of the interpolated first face and the interpolated second face or fading between a first interpolated face frame and a second interpolated face frame based on the interpolation amount.

8. The method of claim 1, wherein:
the first face resampling keyframe includes a first head transform matrix and first face landmark vertices;
performing face tracking on the first video frame further includes determining first texture coordinates for the first face resampling keyframe and a timestamp; and
the first texture coordinates are applied to the first face landmark vertices.

9. The method of claim 1, wherein the first face resampling keyframe is identified by performing red green blue (RGB) face tracking on the first video frame.

10. A non-transitory computer-readable medium with instructions stored thereon that, when executed by one or more computers, cause the one or more computers to perform operations, the operations comprising:
receiving a set of video frames that correspond to a video, the set of video frames including a first video frame and a second video frame that each include a face, wherein the second video frame is subsequent to the first video frame;
performing face tracking on the first video frame to identify a first face resampling keyframe;
performing face tracking on the second video frame to identify a second face resampling keyframe;
deriving an interpolation amount;
interpolating a first background of the first face resampling keyframe and a second background of the second face resampling keyframe based on the interpolation amount;
rendering an interpolated first face and an interpolated second face; and
displaying a final frame that is based on the interpolated first background, the interpolated second background, the interpolated first face, and the interpolated second face.

11. The computer-readable medium of claim 10, wherein the operations further comprise:
blending the first background with the second background to obtain a blended background;
blending the interpolated first face with the interpolated second face to obtain a blended interpolated face; and
generating the final frame by placing a smooth face on top of the blended interpolated face and the blended background.

12. The computer-readable medium of claim 10, wherein the first face resampling keyframe includes a first head transform matrix and first face landmark vertices and further comprising determining a first interpolated face frame by:
using the first head transform matrix to extract a translation vector, a rotation quaternion, and a scale vector;
linearly interpolating the translation vector;
using a linear interpolation to interpolate the rotation quaternion to generate an interpolated rotation quaternion;
linearly interpolating the scale vector to generate an interpolated scale vector;
composing an interpolated translation-rotation-scale matrix based on the interpolated translation vector, the interpolated rotation quaternion, and the interpolated scale vector; and
calculating an interpolated position for the interpolated first face using the interpolated translation-rotation-scale matrix.

13. The computer-readable medium of claim 10, wherein the interpolation amount is derived from (a) a duration between the first face resampling keyframe and the second face resampling keyframe and (b) a current render time.

14. The computer-readable medium of claim 10, wherein the second face resampling keyframe includes a second head transform matrix and second face landmark vertices, and the operations further include determining a second interpolated face frame by calculating a respective displacement for each vertex in the second face landmark vertices.

15. The computer-readable medium of claim 10, wherein interpolating the first background and the second background is done with alpha blending.

16. A system comprising:
one or more processors; and
a memory that stores instructions that, when executed by the one or more processors cause the one or more processors to perform operations comprising:
receiving a set of video frames that correspond to a video, the set of video frames including a first video frame and a second video frame that each include a face, wherein the second video frame is subsequent to the first video frame;
performing face tracking on the first video frame to identify a first face resampling keyframe;
performing face tracking on the second video frame to identify a second face resampling keyframe;
deriving an interpolation amount;
interpolating a first background of the first face resampling keyframe and a second background of the second face resampling keyframe based on the interpolation amount;
rendering an interpolated first face and an interpolated second face; and
displaying a final frame that is based on the interpolated first background, the interpolated second background, the interpolated first face, and the interpolated second face.

17. The system of claim 16, wherein the operations further comprise:
blending the first background with the second background to obtain a blended background;
blending the interpolated first face with the interpolated second face to obtain a blended interpolated face; and
generating the final frame by placing a smooth face on top of the blended interpolated face and the blended background.

18. The system of claim 16, wherein the first face resampling keyframe includes a first head transform matrix and first face landmark vertices and further comprising determining a first interpolated face frame by:
using the first head transform matrix to extract a translation vector, a rotation quaternion, and a scale vector;
linearly interpolating the translation vector;
using a linear interpolation to interpolate the rotation quaternion to generate an interpolated rotation quaternion;
linearly interpolating the scale vector to generate an interpolated scale vector;
composing an interpolated translation-rotation-scale matrix based on the interpolated translation vector, the interpolated rotation quaternion, and the interpolated scale vector; and
calculating an interpolated position for the interpolated first face using the interpolated translation-rotation-scale matrix.

19. The system of claim 16, wherein the interpolation amount is derived from (a) a duration between the first face resampling keyframe and the second face resampling keyframe and (b) a current render time.

20. The system of claim 16, wherein the second face resampling keyframe includes a second head transform matrix and second face landmark vertices, and the operations further include determining a second interpolated face frame by calculating a respective displacement for each vertex in the second face landmark vertices.

* * * * *